United States Patent [19]
Brice et al.

[11] Patent Number: 5,293,720
[45] Date of Patent: Mar. 15, 1994

[54] MODULAR SUPPORT STRUCTURE FOR A CONTROL ROOM WORK STATION

[75] Inventors: Richard M. Brice, Duluth; Thomas M. Gattis, Marietta; Kent R. Brewer; Arthur G. Howard, both of Atlanta, all of Ga.

[73] Assignee: The Human Factor, Inc., Atlanta, Ga.

[21] Appl. No.: 811,249

[22] Filed: Dec. 20, 1991

[51] Int. Cl.⁵ ................................................ A47B 5/00
[52] U.S. Cl. ........................................ 52/36.1; 52/239; 160/135; 160/351
[58] Field of Search .................. 52/239, 36; 160/135, 160/351

[56] References Cited

U.S. PATENT DOCUMENTS

| | | | |
|---|---|---|---|
| 3,305,981 | 2/1967 | Biggs et al. | 52/36 |
| 3,677,322 | 7/1972 | Brorson | 160/135 |
| 3,781,944 | 1/1974 | Gianardi | 160/135 |
| 3,913,656 | 10/1975 | Guyer | 160/351 X |
| 4,443,911 | 4/1984 | Bannister | 160/135 X |
| 4,638,614 | 1/1987 | Wilcox | 160/135 X |
| 4,663,895 | 5/1987 | Brice | 52/33 |
| 4,750,305 | 6/1988 | Bastian | 52/239 X |
| 4,914,873 | 4/1990 | Newhouse | 52/239 X |
| 5,058,347 | 10/1991 | Schuelke | 160/135 X |

Primary Examiner—Carl D. Friedman
Assistant Examiner—Beth A. Aubrey
Attorney, Agent, or Firm—Needle & Rosenberg

[57] ABSTRACT

A modular support structure for a control room work station is disclosed which is capable of being used to support top surfaces of different shapes. The support structure includes a plurality of adjustable posts wherein each post comprises two elongated rectangular post flanges, each having a top edge for supporting the top surface, a bottom edge, an elongated outer edge and an elongated articulating edge opposing said outer edge, and hinge means for articulating said two rectangular post flanges with each other along said articulating edges. The hinged posts permit the attachment of panels at a variety of angles to accommodate the shape of the top surface. Also provided is a control room work station having the modular support structure of the present invention.

20 Claims, 3 Drawing Sheets

MODULAR SUPPORT STRUCTURE FOR A
CONTROL ROOM WORK STATION

BACKGROUND OF THE INVENTION

Instrument control rooms are provided in a variety of different facilities such as nuclear power stations, oil refineries, and electric or fossil fuel generating plants. In such control rooms, instruments are mounted on the walls and must be monitored by operators sitting at a work station wired for control consoles or computer terminals.

Previous work stations such as that disclosed in U.S. Pat. No. 4,663,895, require posts of different shapes to accommodate the various shapes of the top surfaces which they support. The posts of U.S. Pat. No. 4,663,895 are either rectangular, to accommodate square angles or straight lines in the work station's top surface, or they have at least five sides to accommodate other angles in the top surface. The disadvantage of this and other prior art work stations is that a different shape of post is required for each different angle in the top surface supported by the posts in order to accommodate adjoining panels that are attached to the posts. The requirement of differently-shaped posts permits less flexibility in the design of work stations because all of the angles formed by the adjoining panels must be preselected so that posts can be made accordingly.

Therefore, there is a need for a solution of the problem of how to design an operator work station for an instrument control room in a manner so that the work station is aesthetically attractive, provides for ease of wiring with ease of access to wiring after installation, and having design versatility which permits ease of future modifications and use with top surfaces of different shapes.

SUMMARY OF THE INVENTION

The present invention is directed to a modular support structure for a control room work station that is capable of being used to support top surfaces of different shapes. The disclosed invention utilizes hinged posts adjustable through a 270° range of angles, which permits them to be used with non-rectangular shaped top surfaces. The adjustability of the posts permits them to accommodate any angle formed by any two adjacent panels attached to the posts. The adjustability of the hinged posts also reduces the cost of control room furniture because only one post design is required, since the same post design can be used with all work stations and at all post positions within a given work station regardless of shape of the work station.

The posts of the present invention comprise two elongated rectangular post flanges, each having a top edge for supporting the top surface, a bottom edge, an elongated outer edge and an elongated articulating edge opposing said outer edge, and means for articulating said two rectangular post flanges with each other along said articulating edges.

The modular support structure may also include a post having at least one substantially L-shaped post flange extension extending from and substantially perpendicular to the outer edge of at least one of said post flanges and a panel capable of attachment to either a post flange or a post flange extension.

The invention also includes channel elements that support the posts and define a channel through which wires can pass, protected and hidden from view. A removable side on the channel element permits ready access to the wires within. The post design is also such that a post flange and its post flange extension define a vertical channel for the passage of wires from the channel element to the outlets on the top surface. With detachable panels attached to the post flanges and post flange extensions, the wires are concealed between front and back panels but can be easily accessed by detaching a panel. The panels are attached between posts to serve both the function of concealing and protecting wire, as well as the decorative/divider function of the panel assembly.

Also provided is a control room work station having the modular support structure of the present invention.

It is an object of the present invention to provide a modular support structure for a control room work station capable of being used with top surfaces of different shapes.

It is another object of the present invention to provide a control room work station capable of being easily wired with ready access to wires after installation.

DETAILED DESCRIPTION OF THE PREFERRED EMBODIMENT

Figure 1:
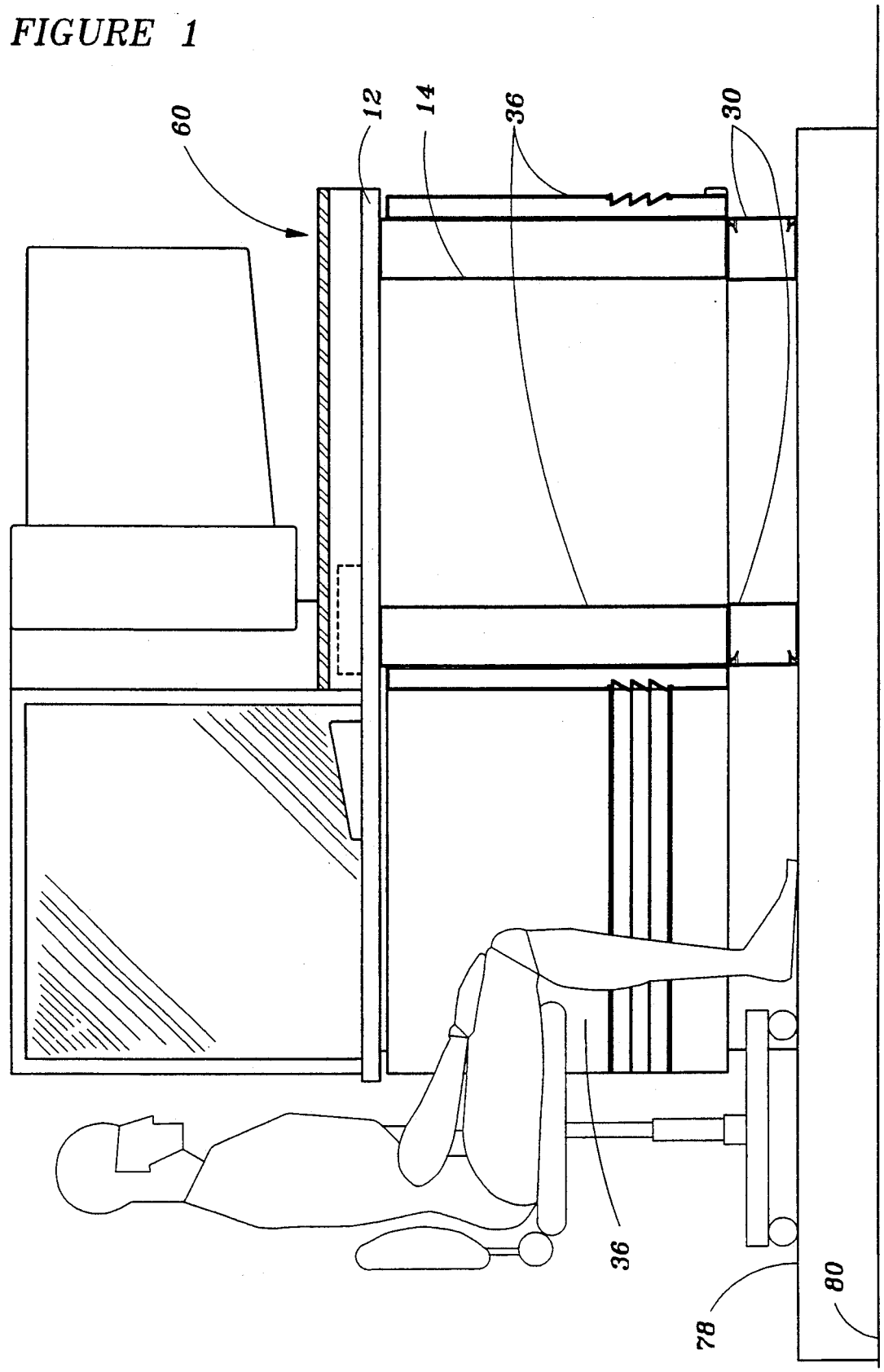
FIG. 1 is a cross-sectional side view of a control room work station.
Figure 2:
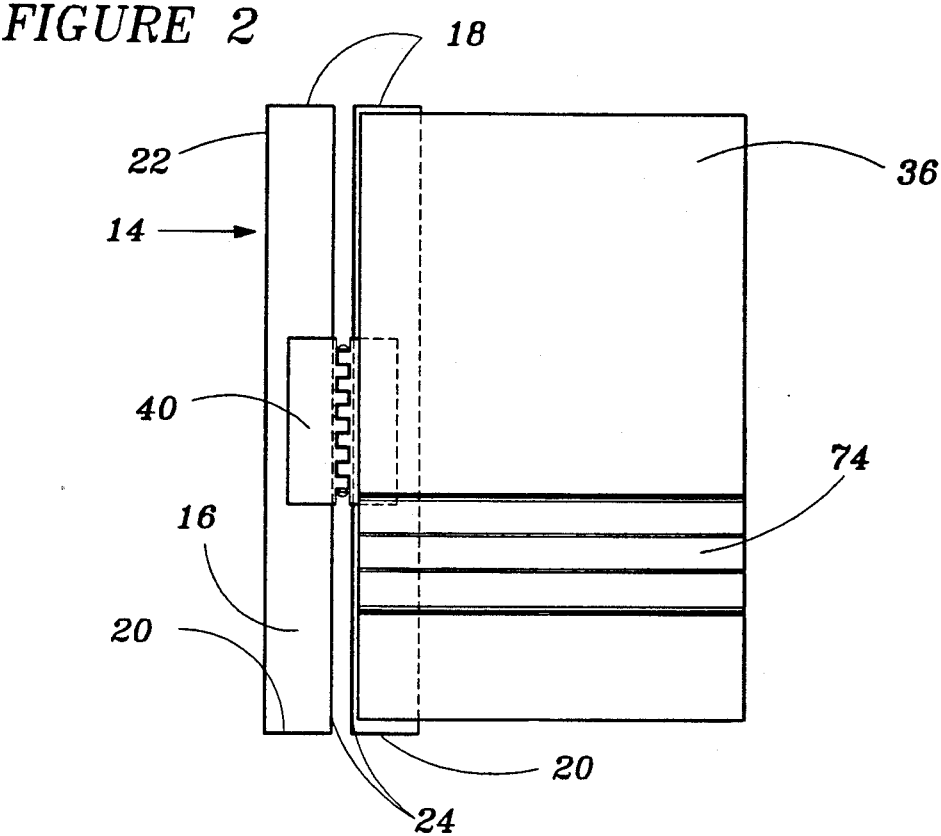
FIG. 2 is a side view of a post and panel of the modular support structure.
Figure 3:
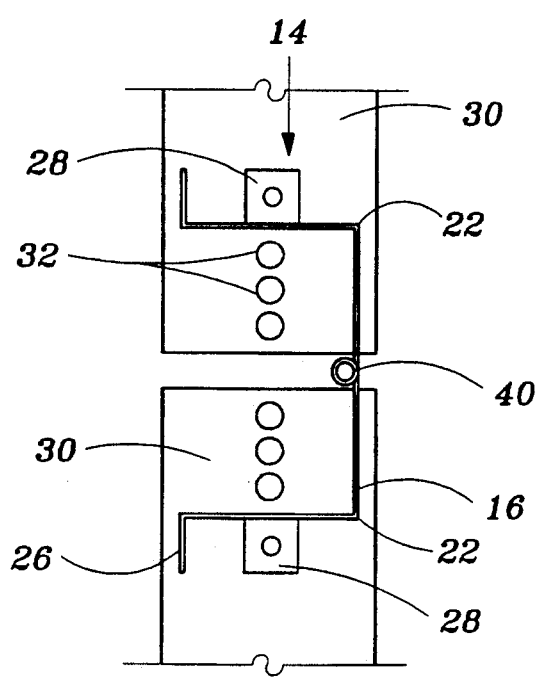
FIG. 3 is a top plan view of the post and channels of the modular support structure.
Figure 5:
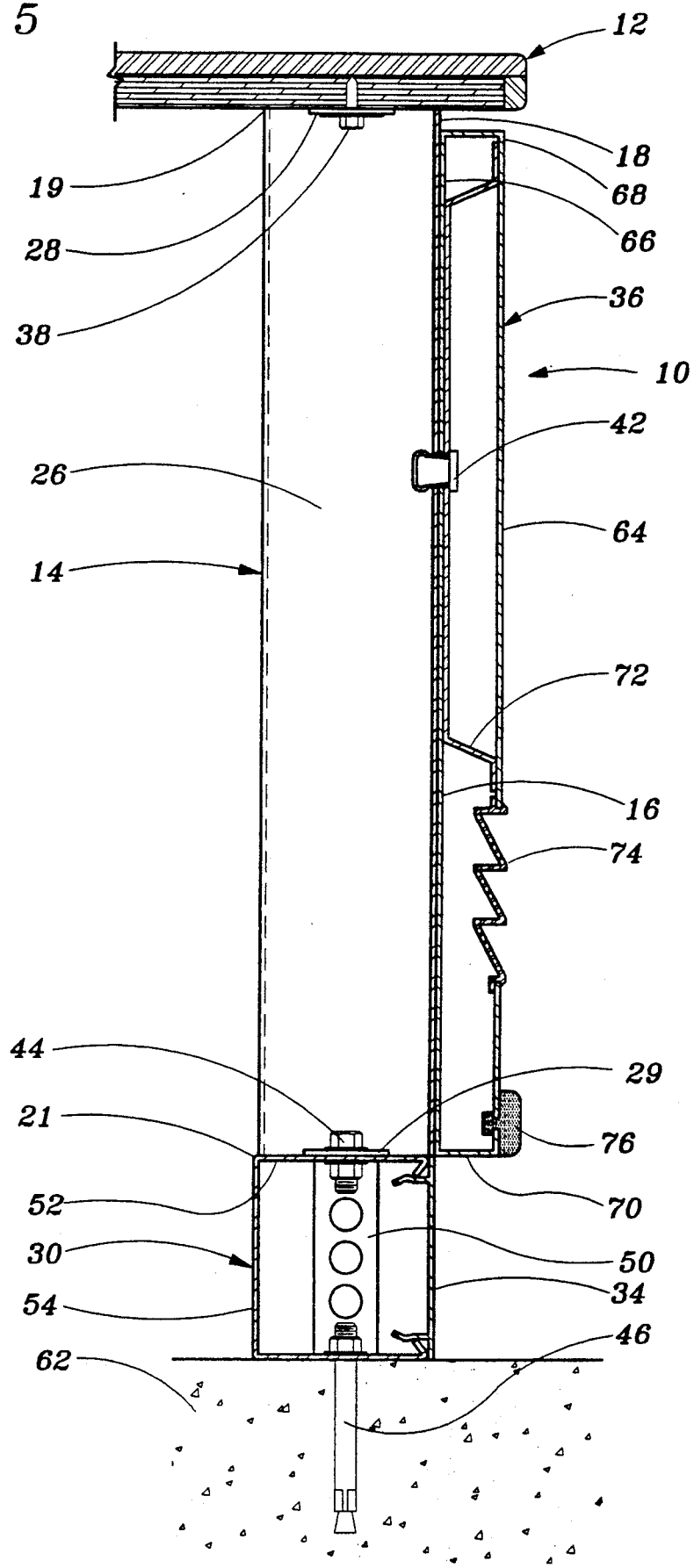
FIG. 5 is a cross-sectional view of the modular support structure of the control room work station.

Referring to the drawings in detail, wherein like numerals indicate like elements, the present invention provides a control room work station 60, shown in FIG. 1, having a generally horizontal top surface 12 and a plurality of vertical posts 14 which support top surface 12. The control room work station according to the preferred embodiment also includes a plurality of panels 36 wherein each panel is capable of attachment to at least one said post 14 and a plurality of elongated, rigid channel members 30 to be disposed horizontally and defining a channel for the passage of wires and cables. As shown in FIG. 2, each post comprises two vertically elongated rectangular post flanges 16, each having a top edge 18 for supporting the top surface 12, a bottom edge 20, an elongated outer edge 22 and an elongated articulating edge 24 opposing said outer edge, and means for articulating 40 said two rectangular post flanges 16 with each other along said articulating edges 24. As shown in FIG. 3 and FIG. 5, the channel members 30 are attached to the bottom edges 20 of the post flanges 16 or post flange extensions 26, and are capable of supporting a plurality of said posts 14 extending vertically therefrom.

The control room work station 60 can also include a raised platform 78 adapted to be supported by a floor 80 and capable of receiving the channel members 30 horizontally disposed thereon. It can be seen that all of the elements of the various embodiments of the modular support structure 10 as described herein can be incorporated into the control room work station 60.

There is shown in FIG. 5 a modular support structure for a control room work station in accordance with the present invention designated generally as 10. The modular support structure comprises a plurality of posts 14, wherein each post 14 has two elongated post flanges 16, each having a top edge 18 for supporting the top surface 12, a bottom edge 20, an elongated outer edge 22 and an elongated articulating edge 24 opposing the outer edge 22 and means for articulating 40 the two rectangular post flanges 16 with each other along their articulating edges 24.

Figure 4:
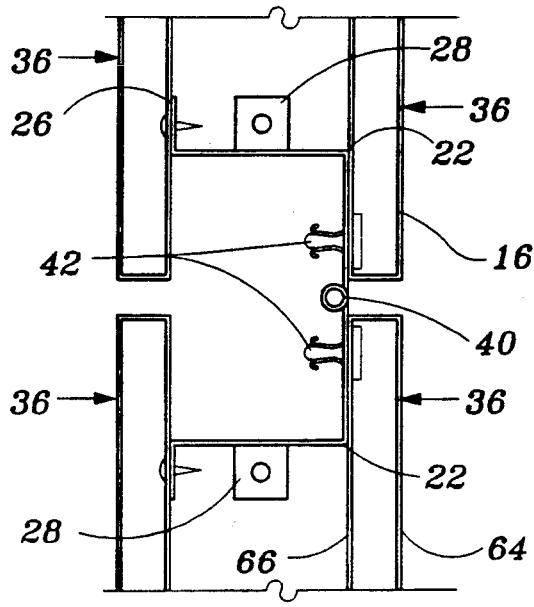
FIG. 4 is a top plan view of the post and panels of the modular support structure.

As shown in FIG. 3 and FIG. 4 the posts 14 of the modular support structure may further comprise at least one substantially L-shaped post flange extension 26 extending from the outer edge 22 of and substantially perpendicular to at least one of the post flanges 16. In the preferred embodiment, the post flange extension 26 is substantially the same length as the post flange 16 and has a top edge substantially aligned with said top edge of said post flange and a bottom edge substantially aligned with said bottom edge of said post flange. The post flange extension 26 can be formed as a part of the unitary structure of the post flange 16, e.g., from the same piece of sheet metal. The post 14 of the support structure can further includes a mounting bracket 28 extending perpendicularly from the top edge of the post flange 16 and substantially parallel to the top surface. Post 14 also includes a mounting bracket 29 extending perpendicularly from the bottom edge 20 of the post flange 16. As shown in FIG. 5, the mounting brackets 28 and 29 extend perpendicularly and outwardly from the top edge 19 and bottom edge 21, respectively, of each post flange extension 26. The mounting brackets 28 and 29 can be formed as a part of the unitary structure of the post flange 16 or post flange extension 26, e.g., from the same piece of sheet metal.

The post flanges 16 and post flange extensions 26 are constructed of sheet metal such as cold rolled steel from 14 to 20 gauge. Other suitable construction materials for the post flange 16 and post flange extension 26 include rigid plastics and wood.

The articulating means 40 can be a hinge, such as that depicted in FIG. 2, FIG. 3 and FIG. 4 or other suitable means for flexibly joining the two post flanges 16 to form post 14. The articulating means 40 can be a knuckled hinge connected to the elongated articulating edges 24 of the two post flanges 16 and joined by a piece of 6¼ gauge wire acting as a pin. The articulating means 40 could alternatively be a knuckled hinge made of plastic such as PVC or ABS, a living hinge constructed of flexible plastic, or other material capable of forming a hinge or other articulating means.

The post 14 can be attached to the top surface 12 by a variety of suitable fastening means, including, but not limited to, a lag bolt 38. In the embodiment using a lag bolt, as shown in FIG. 5, the lag bolt 38 attaches mounting bracket 28 to the top surface 12.

The top surface 12 of the control room work station 60 (FIG. 1 and FIG. 5) can be of any geometric shape that meets the requirements for its intended use. Posts 14 comprise articulating flanges that are adjustable with respect to each other through a 270° range. The posts 14, therefore, are each capable of accommodating at least two panels 36 set at any chosen angle to each other to fit beneath the top surface 12. The top surface 12 can be of any construction and material that satisfies the functional requirements for its particular intended use. For example, the top surface 12 can include a solid surface material laminated to a plywood base. Examples of suitable solid surface materials include CORIAN (DuPont, Wilmington, Del.) or AVONITE (Avonite, Belen, N. Mex.). As an alternative to using a solid surface laminated to plywood, a laminate of plastic on MASONITE can be placed on top of plywood.

The modular support structure further includes a plurality of elongated rigid channel members 30, shown in FIG. 5, disposed horizontally and defining a channel for the passage of wires and cables. As illustrated in FIG. 1 and FIG. 5, the channel members are arranged beneath the top surface 12 to support the posts 14 that fit beneath and support top surfaces 12 of a variety of shapes. The channel members are capable of supporting a plurality of posts 14 extending vertically therefrom. The channel members 30 are attached to the bottom edges 20 of the post flanges 16 or post flange extensions 26 by means of mounting brackets 29 which extend either from the bottom edge of post flanges 16 or post flange extensions 26. Preferably, the channel member 30 is constructed of sheet metal such as 14 to 20 gauge cold rolled steel. Alternatively, 12 to 16 gauge aluminum or rigid plastics, such as ABS, PVC or polycarbonate, could be used to form channel member 30. Channel member 30 can be attached to a floor or other support surface 62 by suitable attachment means such as expansion anchor 46.

The post 14 can be attached to channel member 30 by a variety of suitable fastening means, including a bolt 44 or other fastener suitable for use with sheet metal. In the embodiment using bolt 44, shown in FIG. 5, the bolt fastens mounting bracket 29, extending from the bottom edge of and perpendicularly from one of said post flange extensions 26 to channel member 30. As can be seen in FIG. 5, a channel bracket 50 can be used within channel member 30 to provide an attachment point for bolt 44 and expansion anchor 46 or other fastening means and to provide additional strength to channel member 30. The channel bracket 50 is generally constructed of 14 gauge steel and has apertures through it for the passage of wires within the channel.

The preferred embodiment of the channel member 30 shown in top view in FIG. 3 further defines at least one aperture 32 permitting communication between the interior of the channel and the exterior of the channel for the passage of wires and other elements used in conjunction with a control room work station 60. It is preferred that the apertures in the channel member 30 be located in the top side 52 or back side 54 of the channel member. The preferred channel member 30 will also have a side member 34, shown in FIG. 5, which is capable of removal from the channel member 30 to permit access to the interior of the channel defined by the channel member 30. Removable side member 34 can be constructed with materials similar to those used in channel 30. Removable side member 34 will usually extend the length of channel member 30 to permit access to the entire length of the channel and its contents such as electrical wires and mounting bolts.

As shown in FIGS. 1 and 4, the modular support structure can include a plurality of panels 36, wherein each panel 36 is capable of attachment to either a post flange 16 or a post flange extension 26 of two adjacent posts 14. Preferably any panel 36 will be attached to at least two posts 14, with one post 14 being attached near each end of the panel 36, which, thus, connects the two posts 14. FIG. 4 depicts an embodiment in which a first panel 36 is attached to post flange 16 and a second panel 36 is attached to post flange extension 26 extending perpendicularly from the same post flange 16 of the post 14, thereby defining a space between the two panels 36 for the passage of wires from channel member 30 to either the top surface 12 or to the exterior of panel 36. In this embodiment the wires or other elements within the space formed by the attachment of the two panels 36 are protected from accidental contact from the front and back sides, but are made accessible by the detachable attachment of at least one of the panels 36.

A panel 36 as shown in cross-section in FIG. 5 has the shape of an elongated rectangle having a front side 64, a back side 66, a top 68 and a bottom 70. Generally, the panel is constructed of sheet metal such as 14 to 20 gauge cold rolled steel, but could also be of injection or blow-molded plastic, and can further include a stiffening member 72, preferably made of 16 gauge steel, that confers torsional stability to the panel. In certain applications, such as for computer printer cabinets and the like, the panels 36 can be made of wood. The panel includes a vent 74 that permits passage of heat and air through panel 36. In the preferred embodiment, vent 74 is constructed of an extruded plastic such as vinyl or other suitable material such as vinyl and extends horizontally the entire length of the panel. Another feature of panel 36 that can be used with the instant invention is a bumper 76, which extends horizontally the entire length of the front side 64 of panel 36 and is disposed near the bottom 70 of the panel. Bumper 76 protects the front side 64 of the panel from mechanical damage by objects bumping against it.

The fastening means for attaching the panel 36 to the post 14 can be any suitable fastener and preferably includes a ball stud fastener 42 shown in FIG. 5 which permits ready detachment and reattachment of the panel 36 to post 14 by grasping the panel and pulling it away from the post to detach panel 36 and pushing at the fasteners to attach panel 36 to post 14. Other panel fastening means can include sheet metal screws or other fasteners suitable for use with posts 14. Otherwise, any fastening means suitable for the particular construction of the posts and panels (e.g., wood, plastic, etc.) can be used.

Various other examples and modifications of the foregoing description will be apparent to a person skilled in the art without departing from the spirit and scope of the invention, and it is intended that all such examples and modifications be included within the scope of the appended claims.

What is claimed is:

1. A modular support structure for a control room work station capable of being used to support top surfaces of different shapes, comprising:

a plurality of posts wherein each post comprises two elongated rectangular post flanges, each said flange having a top edge for supporting the top surface, a bottom edge, an elongated outer edge and an elongated articulating edge opposing said outer edge, and means for articulating said two post flanges with each other along said articulating edges.

2. The modular support structure of claim 1, wherein each said post further comprises at least one substantially L-shaped post flange extension extending from the outer edge of and substantially perpendicular to at least one of said post flanges.

3. The modular support structure of claim 2, wherein said post flange extension is substantially the same length as said post flange and has a top edge substantially aligned with said top edge of said post flange and a bottom edge substantially aligned with said bottom edge of said post flange.

4. The modular support structure of claim 3, wherein each said post further comprises a mounting bracket extending from the top edge of said post flange extension.

5. The modular support structure of claim 3, wherein each said post further comprises a mounting bracket extending from the bottom edge of said post flange extension.

6. The modular support structure of claim 1, wherein each said post further comprises a mounting bracket extending from the top edge of and perpendicularly from one of said post flanges of said post.

7. The modular support structure of claim 1, wherein each said post further comprises a mounting bracket extending from the bottom edge of and perpendicularly from one of said post flanges of said post.

8. The modular support structure of claim 2, further comprising a plurality of elongated, rigid channel members to be disposed horizontally and defining a channel for the passage of wires and cables, said channel members being attached to the bottom edges of said post flanges or said post flange extensions, and capable of supporting a plurality of said posts extending vertically therefrom.

9. The modular support structure of claim 8, wherein each said channel member further defines an aperture permitting communication between the interior of the channel and the exterior of the channel for the passage of wires and other elements used in conjunction with a control room work station.

10. The modular support structure of claim 8, wherein each said channel member further comprises a removable side member of said channel member capable of removal from said channel member to permit access to the interior of the channel defined by said channel member.

11. The modular support structure of claim 2, further comprising a plurality of panels, each panel having fastening means for attachment of said panels to either a post flange or a post flange extension of two adjacent posts.

12. A control room work station comprising:
 a. a generally horizontal top surface;
 b. a plurality of vertical posts wherein each post comprises two vertically elongated rectangular post flanges, each having a top edge for supporting the top surface, a bottom edge, an elongated outer edge and an elongated articulating edge opposing said outer edge, and means for articulating said two rectangular post flanges with each other along said articulating edges wherein each post further comprises at least one substantially L-shaped post flange extension extending from and substantially perpendicular to the outer edge of at least one of said post flanges;
 c. a plurality of panels wherein each panel is capable of attachment to two adjacent posts; and
 d. a plurality of horizontally elongated, rigid channel members defining a channel for the passage of wires and cables, said channel members being attached to the bottom edges of said post flanges or said post flange extensions, and capable of supporting a plurality of said posts extending vertically therefrom.

13. The control room work station of claim 12, wherein said post flange extension is substantially the same length as said post flange and has a top edge substantially aligned with said top edge of said post flange and a bottom edge substantially aligned with said bottom edge of said post flange.

14. The control room work station of claim 13, wherein each said post further comprises a mounting bracket extending from the top edge of said post flange extension.

15. The control room work station of claim 13, wherein each said post further comprises a mounting bracket extending from the bottom edges of and perpendicularly from at least one of said post flanges and said post flange extensions of said post.

16. The control room work station of claim 12, wherein said panels are attached to adjacent said post flanges and another of said panels is attached to adjacent said post flange extensions on adjacent posts, thereby defining a vertical channel for the passage of wires therethrough.

17. The control room work station of claim 12, wherein each said post further comprises a mounting bracket extending from the top edge of and perpendicularly from one of said post flanges of said post.

18. The control room work station of claim 12, wherein each said channel member further defines an aperture permitting communication between the interior of the channel and the exterior of the channel for the passage of wires and other elements used in conjunction with a control room work station.

19. The control room work station of claim 12, wherein each said channel member further comprises a removable side member of said channel member capable of removal from said channel member to provide access to the interior of the channel defined by said channel member.

20. The control room work station of claim 12, further comprising a platform adapted to be supported by a floor and capable of receiving said channel members horizontally disposed thereon.

* * * * *